Sept. 15, 1925.
S. A. STAEGE
1,553,407
SPEED REGULATOR SYSTEM
Original Filed Nov. 6, 1919
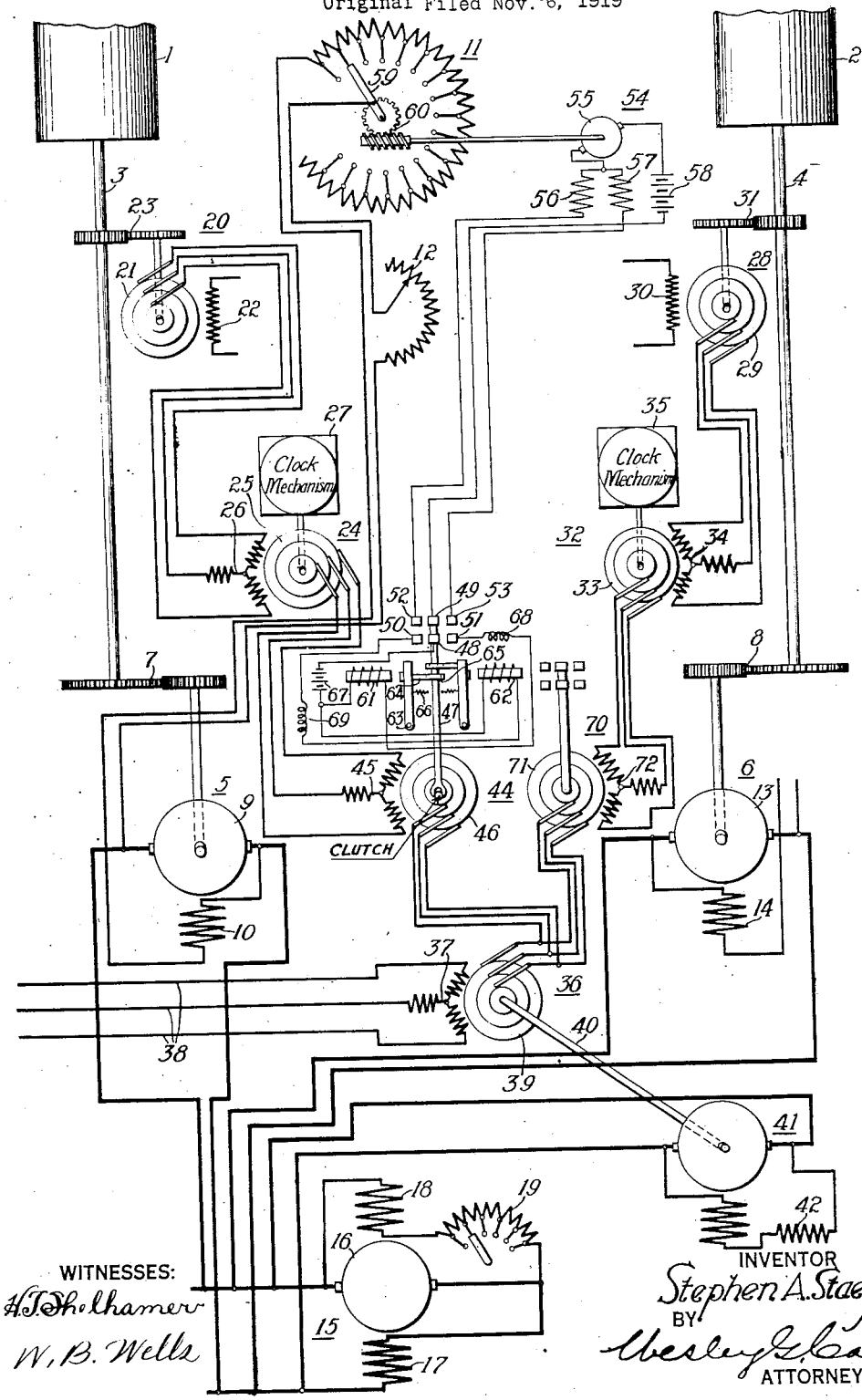
WITNESSES:
H. J. Sholhamer
W. B. Wells
INVENTOR
Stephen A. Staege.
BY
Wesley G. Carr
ATTORNEY Patented Sept. 15, 1925.

1,553,407

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed November 6, 1919, Serial No. 336,118. Renewed June 23, 1925.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems and particularly to regulator systems for maintaining a constant speed ratio between a number of rotating members.

One object of my invention is to provide a speed-regulator system that shall be simple and effective in operation, that shall control a number of rotating members to maintain a constant speed ratio between them, that shall effect change in the speed of all members, at will, without disturbing the speed ratio and that shall have a clock mechanism associated with each rotating member for governing the speed of each member.

In many industrial establishments, it is essential to operate a number of rotating members at a constant speed ratio and it is very often desirable to be able not only to change the speed of all members according to operating conditions but also to change the speed of each member at will. Thus, in a paper mill it is essential to maintain a constant speed ratio between the various rolls through which the paper is passing in order to maintain an even tension upon the paper and, at certain times, it is essential, for efficient operation, that the speed of all rolls be changed to vary the speed of the paper passing through the rolls.

In a regulator system constructed in accordance with my invention, the speeds of all rotating members are so dependent upon sets of frequency changers as to maintain the speed ratio of the rotating members substantially constant.

In the preferred method of practicing my invention, each rotating member is propelled by a motor, preferably a shunt-wound motor, and a rheostat is connected in circuit with the field winding of the motor for varying the excitation to control the speed of the rotating member. Each rotating member operates an alternating-current generator which, in turn, energizes a frequency changer that is operated by clock mechanism. A common frequency changer is provided which is operated by any suitable auxiliary motor. The speed of each of said frequency changers may be adjusted at will. An alternating-current supply circuit of any suitable frequency is connected to the primary winding of the auxiliary frequency changer. Each rotating member is provided with an induction motor, the primary winding of which is connected to the secondary winding of the associated frequency changer and the secondary winding of which is connected to the secondary winding of the common frequency changer. Thus, it is apparent that any change in speed of the rotating member will deliver a frequency to the primary winding of the induction motor in accordance with such change and, accordingly, the induction motor is operated in a clockwise or in a counter-clockwise direction according to the change in the speed of the rotating member.

It is assumed that, under normal operating conditions, the frequency changer operated by the clock mechanism and the frequency changer operated by the auxiliary motor deliver currents of the same frequency to the induction motor operated as a differential machine so that no torque is produced by the induction motor until there is a variation in speed of the rotating member to cause a change in the frequency of the current supplied to the induction motor. The induction motor is provided with a contact-making device for controlling the rheostat which is in circuit with the field winding of the propelling motor or the rotating member. Moreover, means is provided for intermittently operating the contact-making device to effect a step-by-step movement of the rheostat and thus prevent overtravel and the so-called hunting action.

In the above manner, the excitation of each propelling motor is governed to maintain the speed ratio between all the rotating members substantially constant. If it is desired to change the speed of all rotating members without disturbing the speed ratio between them, it is merely necessary to change the voltage of the generator which supplies power to all the propelling motors.

The single figure of the accompanying drawing is a diagrammatic view of a regulator-system constructed in accordance with my invention.

Referring to the drawing, two rolls 1 and 2 of a paper mill are provided with shafts 3 and 4 which are respectively connected to motors 5 and 6 by means of gearing systems 7 and 8. The motor 5, which is preferably a shunt-wound motor, is provided with an armature 9 and a shunt field-magnet winding 10 which is connected in circuit with any suitable rheostats 11 and 12. The rheostat 11 is automatically operated to maintain a constant speed ratio between all of the propelling motors and the rheostat 12 is manually operated to vary the excitation of the motor 5 and, accordingly, control its speed at will.

The motor 6 comprises an armature 13 and a shunt field-magnet winding 14 which is connected in circuit with any suitable regulating rheostats (not shown). The motors 5 and 6 are connected to any suitable generator 15. The generator 15 comprises an armature 16, a series field-magnet winding 17 and a shunt field-magnet winding 18. A resistor 19 is connected in circuit with the shunt field-magnet winding 18 for varying the excitation of the generator 15 to control the speed of the propelling motors.

An alternating-current generator 20, comprising an armature 21 and a field-magnet winding 22, is connected to the shaft 3 by any suitable gearing 23 in order to develop a frequency which varies in accordance with the speed of the motor 5 and the member 1. The field-magnet winding 22 is connected to any suitable source of direct current. A frequency changer 24, comprising a secondary winding 25 and a primary winding 26, is operated by any suitable clock mechanism 27. The primary winding 26 is connected to the generator 20 in order to be energized by a frequency which varies in accordance with the speed of the rotating member 1.

An alternating-current generator 28, comprising an armature 29 and a field-magnet winding 30, is connected to the shaft 4 by any suitable gearing 31 in order to produce a frequency which varies in accordance with the speed of the member 2 and the motor 6. The field-magnet winding 30 is connected to any suitable source of direct current. A frequency changer 32, comprising a secondary winding 33 and a primary winding 34 is operated by a clock mechanism 35 which may be varied at will. The primary winding 34 is connected to the generator 28 in order to energize the frequency changer in accordance with the speed of the member 2.

An auxiliary frequency changer 36, which is common to all the rotating members, is provided with a primary winding 37, which is connected to any suitable three-phase supply circuit 38, and a rotor 39 which is directly connected by a shaft 40 to a direct-current motor 41. The motor 41 is preferably a shunt-wound motor and is provided with any suitable means, for example, a rheostat 42, for varying its speed. A control motor 44, preferably of the induction type, is associated with the rotating member 1 and comprises a primary winding 45 and a secondary winding 46. The primary winding 45 is directly connected to the secondary winding 25 of the frequency changer 24, and the secondary winding 46 is directly connected to the secondary winding 39 of the auxiliary frequency changer 36. A contact arm 47 is connected to the rotor of the induction motor 44 in any suitable manner to be operated in accordance with the rotation of the motor. The contact arm carries two contact members 48 and 49 which are respectively adapted to engage contact members 50 and 51 and 52 and 53, according to the direction of rotation of the rotor 46. The connection between the contact arm 47 and the rotor of the motor 44 should embody a suitable clutch mechanism in order to permit the free rotation of the motor after the contact members 49 and 48 have engaged any of the stationary contact members associated with them.

A motor 54, comprising an armature 55 and two differentially related field-magnet windings 56 and 57, is provided for operating the rheostat 11 in accordance with the operation of the induction motor 44. When the induction motor 44 is operated in a counter-clockwise direction to effect engagement between the contact members 52 and 49, a circuit is completed from the battery 58 through the armature 55 and the field-magnet winding 56 for operating the motor 54 in a counter-clockwise direction to decrease the resistance value of the rheostat 11 which is included in circuit with the field-magnet winding 10 of the motor 5. Upon rotation of the induction motor 44 in a clockwise direction, engagement is effected between the contact members 49 and 53 and a circuit is completed from the battery 58 through the armature 55 and the field-magnet winding 57. Accordingly, the motor 54 is operated in a clockwise direction to increase the resistance value of the rheostat 11 which is included in circuit with the field winding 10 of the propelling motor 5. The motor 54 is connected to the arm 59 of the rheostat 11 in any suitable manner, for example, by means of a worm gearing 60.

In order to prevent sticking of the contact members 49 and 53 and 49 and 52 and to effect a step-by-step movement of the rheostat 11, two electromagnets 61 and 62 are provided for returning the contact arm 47 to neutral position in a predetermined time after it has been operated by the induction motor 44. The electromagnet 61 controls an armature 63 having a projecting arm 64 which is provided with a slot 65 through which the contact arm 47 extends. A spring 66 is provided for biasing the armature 63 to a retracted position. The slot 65 in the arm 64 is of such length that if the contact members 49 and 53 are in engagement with each other, the operation of the armature 63 by the electromagnet 61 will return the contact arm 47 to neutral position. In case the induction motor 44 is operated in a clockwise direction to effect engagement between the contact members 49 and 53, the contact member 48 engages the contact member 51 and completes a circuit from the battery 67 through the electromagnet 61. The electromagnet 61 is rendered slow acting by means of an inductance 68 which is connected in circuit with it and, accordingly, after a predetermined time returns the contact arm 47 to neutral position and breaks the circuit of the rheostat motor 54. The electromagnet 62 is provided with a similar armature for returning the contact arm 47 to neutral position when the induction motor 44 has been operated in a counter-clockwise direction. The electromagnet 62 is also provided with an inductance 69 for rendering its action somewhat sluggish.

An induction motor 70, similar to the induction motor 44, is associated with the rotating member 2 and comprises a secondary winding 71 and a primary winding 72. The primary winding 72 is connected to the secondary winding 33 of the frequency changer 32 and the secondary winding 71 is connected to the secondary winding 39 of the auxiliary frequency changer 36. The induction motor 70 is similar in construction and operation to the induction motor 44 and serves to govern a rheostat (not shown) for controlling the excitation of the motor 6. Inasmuch as the controlling of the speed of the rotating member 2 by the variation of the excitation of the motor 6 is similar to the controlling of the speed of the rotating member 1, it is deemed sufficient to describe only the operation of controlling the speed of the rotating member 1. However, it may be noted that any number of rotating members may be controlled in a similar manner to maintain a constant speed ratio between the members.

Assuming the generator 20 and the frequency changer 24 to be so adjusted that the frequency produced by the frequency changer 24 is the same as the frequency produced by the frequency changer 36 and no torque is produced on the induction motor 44, a change in the speed of the rotating member 1 will vary the frequency of the frequency changer 24 to operate the induction motor 44 in a clockwise or in a counter-clockwise direction.

Assuming the speed of the rotating member 1 to be above normal value, the frequency of the frequency changer 24 is varied to operate the induction motor 44 in a counter-clockwise direction. Upon operation of the induction motor in a counter-clockwise direction, engagement is effected between the contact members 49 and 52 and a circuit is completed from the battery 58 for operating the motor 54 in a counter-clockwise direction. Thereupon, the rheostat 11 is operated to reduce the resistance included in circuit with the field winding 10 and, accordingly, to reduce the speed of the motor 5 to normal value.

During the operation of the induction motor 44 in a counter-clockwise direction, the electromagnet 62 is operated to separate the contact members 49 and 52 and prevent further operation of the rheostat motor 54. If the induction motor 44 continues operation in a counter-clockwise direction, engagement is again effected between the contact members 49 and 52 and the above cycle of operations is again repeated. Upon attaining normal speed by the motor 1, the frequency produced by the frequency changer 24 is returned to normal value and operation of the induction motor 44 is stopped.

If the rotating member 1 is operated below normal speed, the generator 20 supplies a frequency below normal value to the frequency changer 24. Consequently, a frequency is produced by the frequency changer 24 for operating the induction motor 44 in a clockwise direction. Upon operation of the induction motor 44 in a clockwise direction, engagement is effected between the contact members 49 and 53 for completing a circuit from the battery 58 to operate the motor 54 in a clockwise direction. Thereupon, the rheostat 11 is operated to increase the resistance included in circuit with the field winding 10, and, consequently, to increase the speed of the motor 5 and the rotating member 1 to normal value. During the operation of the induction motor 44 in a clockwise direction, the electromagnet 61 effects intermittent operation of the contact member 49 for preventing any hunting action.

In like manner, the induction motor 70 is controlled by the frequency changer 32 and the frequency changer 36 for governing the excitation of the propelling motor 6 to maintain the speed of the rotating member 2 substantially constant. Likewise any number of rotating members may be connected to, and controlled in accordance with the speed of, the auxiliary frequency changer 36 and, in case it is desired to change the speed of all rotating members without disturbing the speed relation between the various members, it is only necessary to operate the rheostat 19 and vary the voltage of the generator 15 which, in turn, controls the speed of the motors 5, 6 and 41. The speed of any individual rotating member may be varied by adjusting the operation of the clock mechanism which operates the associated frequency changer.

Modifications in the system and arrangement and location of parts may be made within the spirit and scope of my invention, and such modifications are intended to be covered by the appended claims.

I claim as my invention:

1. In a speed-regulator system, the combination comprising a rotating member, a motor for operating said member, a frequency changer associated with the rotating member and energized in accordance with the speed of the member, a clock mechanism for operating said frequency changer, a second frequency changer and means jointly controlled by said frequency changers for governing the excitation of the motor to govern the motor speed.

2. In a speed-regulator system, the combination comprising a frequency changer operated by clock mechanism, a motor, means for energizing the frequency changer in accordance with the operation of said motor, a second frequency changer, and means jointly controlled by said frequency changers for varying the excitation of the motor to maintain a constant motor speed.

3. In a speed-regulator system, the combination comprising a plurality of rotating members, a dynamo-electric machine associated with each of said members and operated in accordance with the speed thereof, adjustable mechanisms for independently operating said machines, an auxiliary dynamo-electric machine, and means for controlling the speed of each rotating member, said means being jointly controlled by the auxiliary machine and the machine associated with the respective rotating members.

4. In a speed-regulator system, the combination with a plurality of rotating members, a frequency changer energized in accordance with the operation of each rotating member, and speed mechanisms for operating said frequency changers, the speeds of said mechanisms being variable at will, of a common frequency changer, and means jointly controlled by the common frequency changer and the frequency changer associated with the rotating member for maintaining the speed of each rotating member substantially constant.

5. In a speed-regulator system, the combination comprising two rotating members, a frequency changer associated with each rotating member, energized in accordance with the speed thereof and operated by clock mechanism, a frequency changer common to all of said rotating members, and means jointly controlled by the common frequency changer and the individual frequency changers for operating the rotating members at the same relative speed.

6. In a speed-regulator system, the combination comprising a rotating member, a frequency changer operated by a clock mechanism and energized in accordance with the speed of the rotating member, a second frequency changer operated under constant conditions, and means jointly controlled by said frequency changers for maintaining the speed of said rotating member substantially constant.

7. In a speed-regulator system, the combination with a rotating member and a motor for operating the member, of a dynamo-electric machine operated in accordance with the variations in the speeds of said member, a pair of electromagnets, a contact arm controlled jointly by said machine and said electromagnets, two sets of contact members controlled by the contact arm, means controlled by the first set of contact members for selectively energizing said magnets, and means controlled by the second set of contact members for controlling the energization of the motor to maintain its speed constant.

8. In a speed-regulator system, the combination with a plurality of rotating members, a motor for operating each of said members, a frequency changer associated with each member and energized in accordance with the speed of the member, a clock mechanism for operating each of said frequency changers, and a frequency changer common to all of said rotating members, of a dynamo-electric machine associated with each of said motors and jointly controlled by the common frequency changer and the associated frequency changer, and means controlled by said dynamo-electric machines for varying the excitation of the motors to maintain the relative speeds of said rotating members substantially constant.

9. In a speed-regulator system, the combination with a rotating member, a propelling motor therefor, two frequency changers, and a dynamo-electric machine jointly controlled by said frequency changers, of two electromagnets, a contact arm jointly controlled by said magnets and said machine for operating two sets of contact members, means controlled by the first set of contact members for operating the magnets to return the contact arm to initial position after operation by the machine, and means controlled by the second set of contact members for governing the excitation of said motor to maintain its speed substantially constant.

10. In a speed-regulator system, the combination with a rotating member, a propelling motor for said member, a frequency changer operated by clock mechanism and energized in accordance with the speed of said motor, and an auxiliary frequency changer, of a dynamo-electric machine jointly controlled by said frequency changers, a contact arm controlled by said machine, two sets of contact members controlled by said arm, two electromagnets controlled by one of said sets of contact members for returning the arm to initial position after operation by the machine, and means controlled by the second set of contact members for governing the motor excitation to maintain constant motor speed.

11. In a speed-regulator system, the combination with a plurality of rotating members, a motor for operating each of said members, an alternating-current generator operated by each member, a frequency changer associated with each of said members and energized by the associated generator, and a clock mechanism for operating each of said frequency changers, of a frequency changer common to all of said rotating members, a dynamo-electric machine associated with each of said motors and jointly controlled by the common frequency changer and the associated frequency changer, and means comprising rheostats controlled by the dynamo-electric machines for varying the excitation of said motors to maintain the relative speeds of said rotating members substantially constant.

In testimony whereof, I have hereunto subscribed my name this 1st day of Nov., 1919.

STEPHEN A. STAEGE.